May 21, 1968     T. GARY DRAYER ET AL     3,383,843

TRACTOR MOUNTED CORN HARVESTER

Filed Sept. 27, 1965     4 Sheets-Sheet 1

Inventors:
T. Gary Drayer
Ralph L. Sutton
By
F. David Au Buchon Atty.

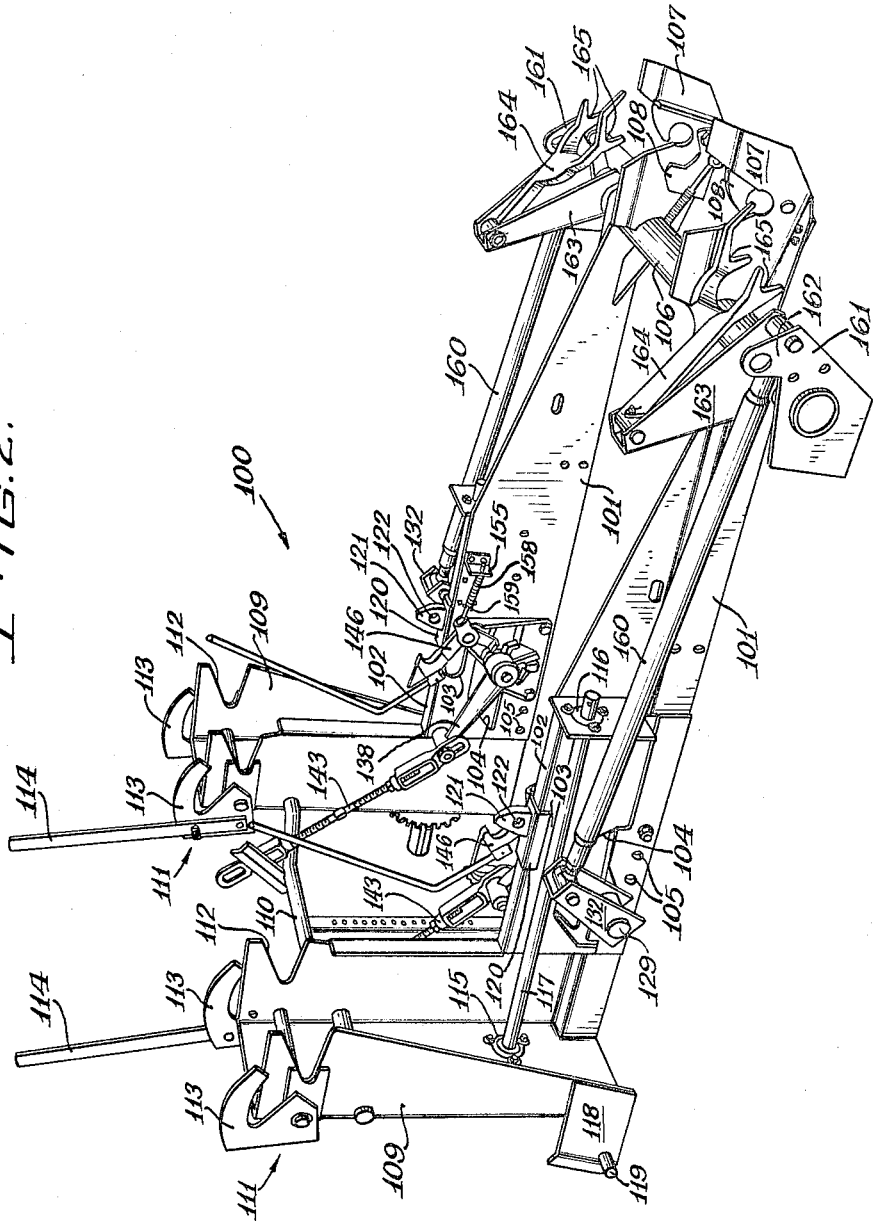

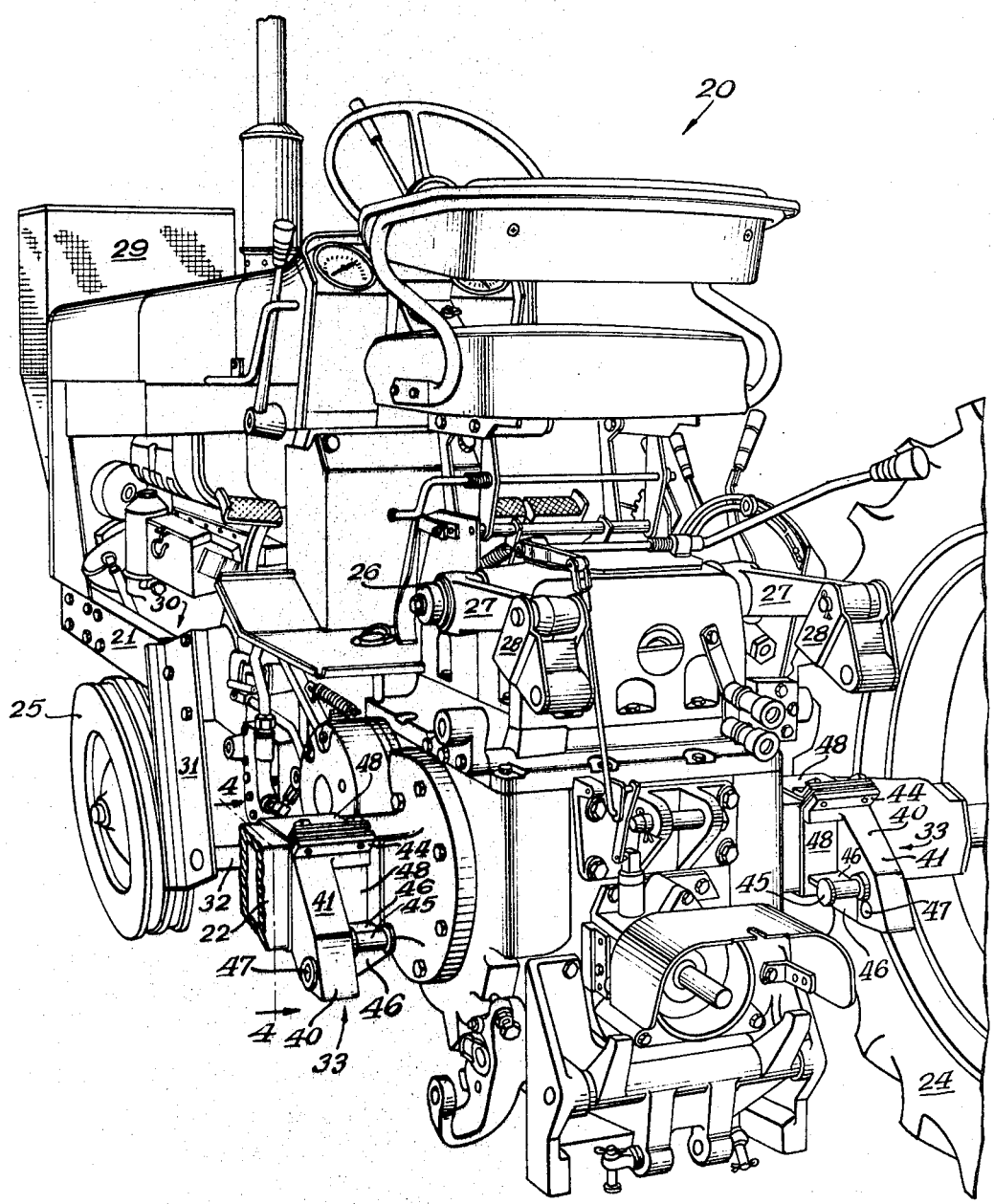

May 21, 1968     T. GARY DRAYER ET AL     3,383,843
TRACTOR MOUNTED CORN HARVESTER
Filed Sept. 27, 1965     4 Sheets-Sheet 4
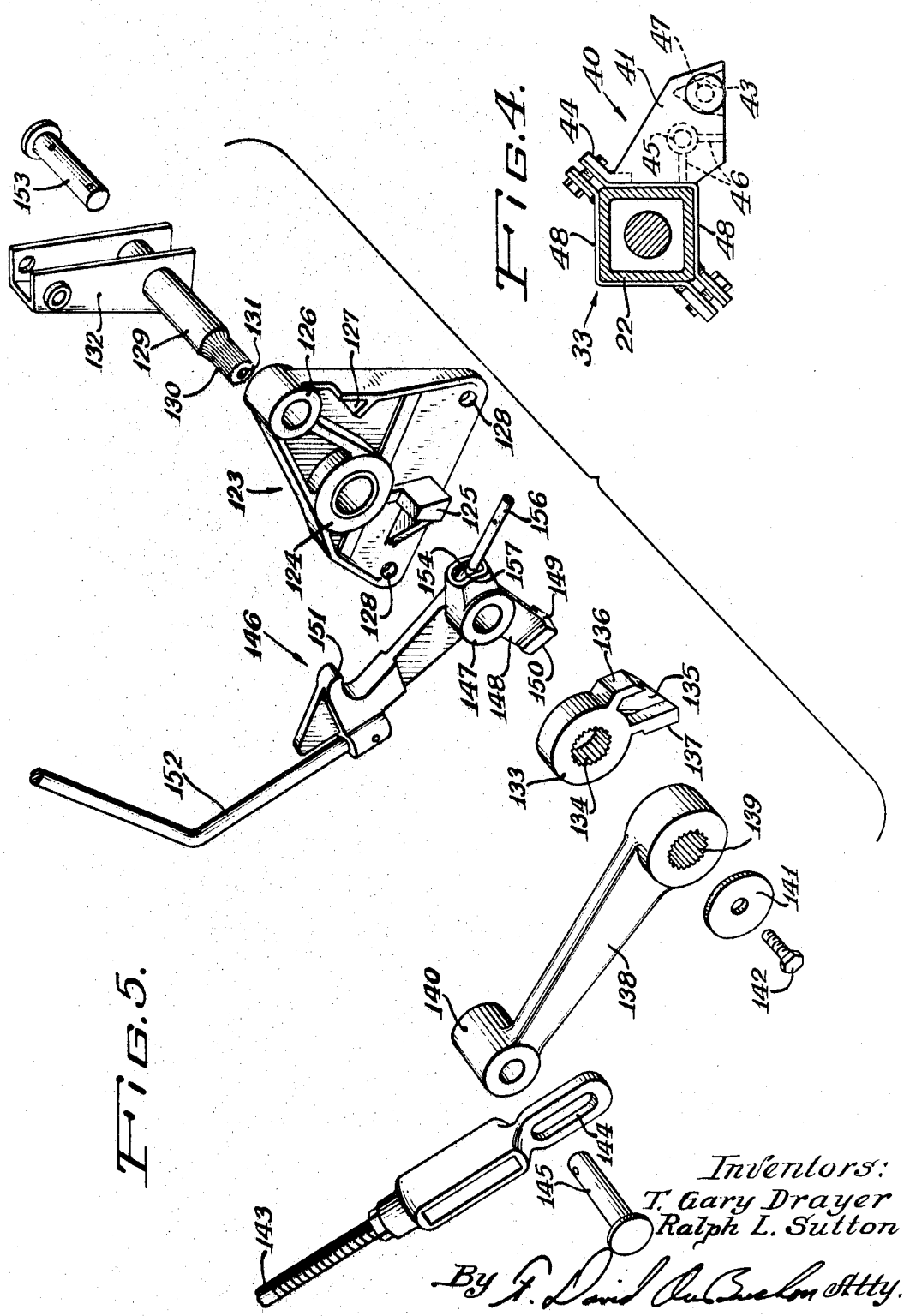
Inventors:
T. Gary Drayer
Ralph L. Sutton 3,383,843
TRACTOR MOUNTED CORN HARVESTER
T. Gary Drayer, East Moline, and Ralph L. Sutton, Rock Island, Ill., assignors to International Harvester Company, a corporation of Delaware
Filed Sept. 27, 1965, Ser. No. 490,441
9 Claims. (Cl. 56—15)

The present invention relates generally to improvements in tractor mounted corn harvesters and the like and more particularly to a new and improved corn harvester that is adapted to be mounted on a large class of tractors.

In the field of tractor mounted corn harvesters, it has been a general practice to supply the purchaser of a corn harvesting machine with a special kit for adapting the machine to the purchaser's tractor. A large variety of kits were necessary in order to adapt the particular harvesting machine to the many models and sizes of tractors. This of course required the manufacturer to design this assortment of adaption kits, the dealer to warehouse them, and was a source of much inconvenience for the user of corn harvesting machines.

The general purpose of this invention is to provide a corn harvesting machine that can be readily adapted for mounting on a large class of tractors with a minimum use of special adaption kits. To attain this the main frame is provided with an adjustable mounting bracket that supports an adjustable pivot shaft arm and lug.

An object of the present invention is the provision of a mounted corn harvester that can be adapted for mounting on a large class of tractors.

Another object is to provide a mounted corn harvester that can be quickly and easily adjusted for mounting on a particular tractor.

A further object is to provide a mounted corn harvesting machine with a readily adjustable means for mounting and dismounting the machine on a tractor.

These and other objects of the invention will become more apparent from the specification and drawings wherein:

FIGURE 2 is a perspective view of the main frame of a corn harvesting machine incorporating applicants' invention.

FIGURE 3 is a rear perspective view of a tractor having the left rear drive wheel removed to more clearly show the front and rear tractor mounts.

FIGURE 4 is a view taken along lines 4—4 of FIGURE 3, and

FIGURE 5 is an exploded view of the mounting plate and its associated elements.

Figure 1:
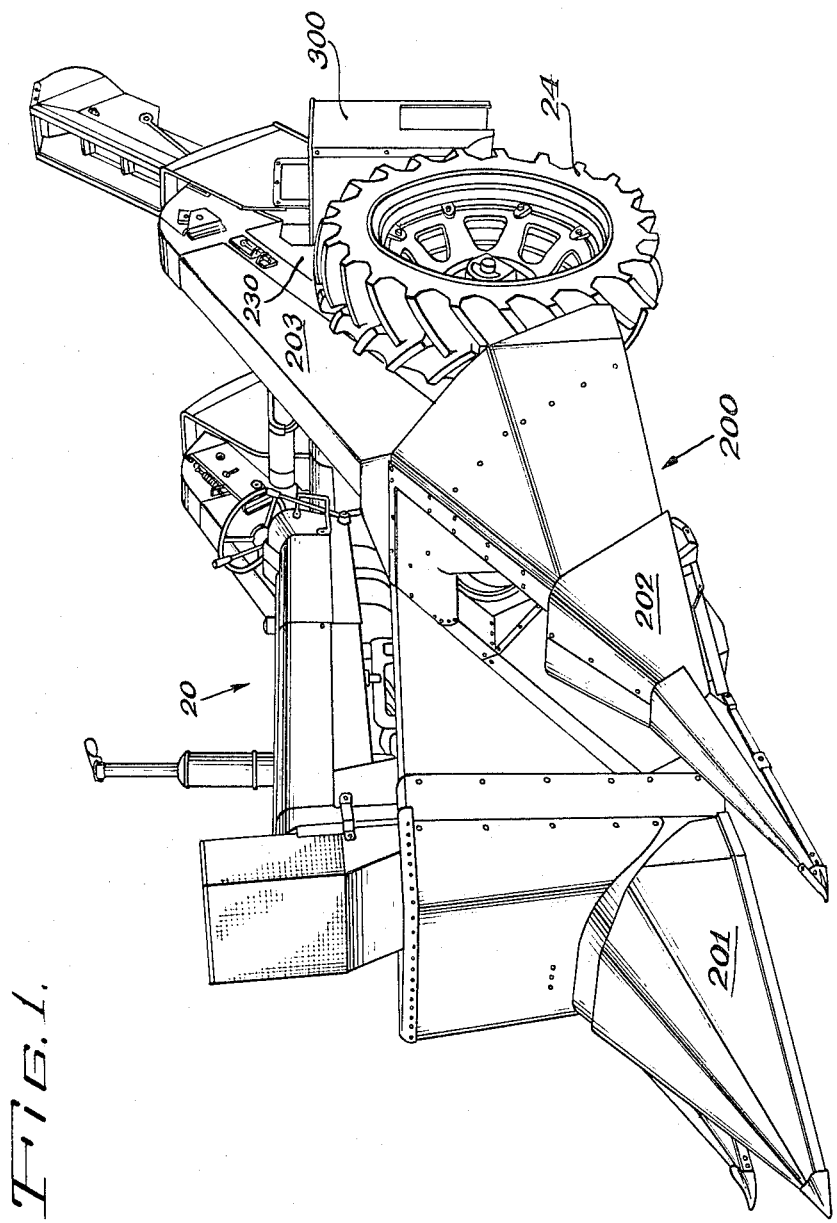
FIGURE 1 is a perspective view of a tractor and corn harvesting machine incorporating applicants' invention.

Referring now to the drawings wherein like reference characters designate like or corresponding parts throughout the several views, there is shown in FIGURE 1 a tractor generally designated 20 having a longitudinal chassis 21, rear axle unit 22, and drive wheels 24. A picking unit 200 having a center divider 201, outer gathering points 202, first elevators 203 and downwardly extending post 230. The corn harvesting machine also includes a processing unit 300. As can be best seen in FIGURE 3, the tractor 20 is of the type having dirigible front wheels 25 and a hydraulically actuated hitch rockshaft 26 having lever arms 27. The free ends of the lever arms can be provided with links 28 for a purpose that shall be further discussed. In preparing a tractor for the mounting of applicants' corn harvesting machine, a special air scoop such as that indicated at 29, can be provided. A front tractor mount 30 made up of plates 31 and a connecting horizontally extending bar 32 are secured by bolts or the like to the longitudinal chassis 21 of the tractor.

A rear tractor mount 33 is mounted on each side of the rear axle unit 22.

The rear mounts, see FIGURES 3 and 4, include a pair of V-shaped plates 48 that are adapted to conform to the shape of the rear axle unit 22. A casting or fabricated element generally designated 40 is connected to one of the V-shaped plates 48 by welding or the like. The casting 40 is made up of a main section 41 having a bottom surface 42. A pyramid-shaped or upwardly converging cavity 43 opening in the bottom surface 42 is formed in the main section 41. A generally cylindrical bore 47 arranged horizontally and passing through the pyramid-shaped cavity 43 is also formed in the main section 41. The casting 40 has a flange 44 along its upper edge for the purpose of providing a better connection to the rear V-shaped plate 48. A bar 45 arranged generally horizontally extends outwardly from one side of the main section 41. The bar 45 is bolstered on its forward and lower edge by webs 46. It should be noted that the upper and rear portion of bars 45 are not obstructed by the webs 46.

Both the front tractor mount 30 and the rear tractor mounts 33 are compact and positioned on the tractor such that they will not interfere with the use of the tractor for other purposes than mounting a corn harvesting machine. Thus it would be expected that the front and rear tractor mounts would remain on the tractor when it is being used for purposes other than mounting a corn harvesting machine. The casting 40 can be provided in several sizes or variations to adapt applicants' corn harvesting machine for a larger variety of tractors.

Applicants' invention disclosed herein is an improvement upon the machine disclosed in the co-pending application of Reynold Barkstrom et al., Serial No. 434,972, filed on Feb. 24, 1965, now U.S. Patent No. 3,320,730, and a disclosure of only so much of this corn harvesting machine as is necessary for an understanding of the subject invention will be repeated herein. For a more complete disclosure of the various elements of the corn harvesting machine, reference should be made to the above referred to application.

Referring now to FIGURE 2, the universal main frame 100 includes a pair of longitudinally extending beams 101 having an upper surface 102 along the rear portions of said beams. A transverse tube 106 connects the front portions of the longitudinally extending beams 101 and includes end portions extending outwardly from the beams. An upright post 109 extends upwardly from the rear end of each of the longitudinally extending beams 101 and the upper portion of the post 109 are connected by a horizontal pipe 110. Picker mounts 111 are located on the upper portions of the upright post and include notches 112 formed by diverging edges, cam plates 113 having handles 114 that can be grasped by the operator. The front guides 107 having upwardly opening V-shaped notches are secured to the transverse tube 106. Locks 108 are provided for securing the front guides 107 to the horizontally extending bar 32 of the front tractor mount. The end portions of transverse tube 106 provide the means upon which bellcranks 161 are pivotally mounted. Push rods 164 are pivotally secured to the free ends of the second bellcrank arms 163. The free ends of the pushrods 164 form cradles 165 that are adapted to seat bars carried by the front portions of the picking unit 200. The rear portion of the picking unit, being pivotally connected to the main frame by the picker mounts 111, is oscillated about the picker mounts 111 in response to oscillation of the bellcranks 161. The bellcranks 161 are rocked by actuation of the hydraulic hitched rockshaft 26 which motion is transmitted through the lifting links 143, lifting arms 138, pivot shafts 129, pivot shaft arms 132 and the turnbuckles 160. It should be noted that the forward end of the turnbuckles 160 are pivotally connected to the first bellcrank arm 162. Reference may be had to the above referred to application for more detailed disclosure of this mechanism.

The bearings 115 and 116 support drive shafts 117 that function to transmit rotary power from the power takeoff shaft of the tractor to the driven elements of the picking unit 200.

As best seen in FIGURE 2, an angle-iron 120 is connected to the upper surface 102 of the longitudinally extending beams 101 by welding or the like. The angle-irons 120 are the mounting means for the pyramid-shaped or upwardly tapering horns 121. Cylindrical bores 122 are formed in the pyramid-shaped horns 121 and are adapted to be aligned with the cylindrical bores 47 formed in the main section 41 of the casting 40. When the pyramid-shaped horn 121 is inserted into the pyramid-shaped cavity 43, it should be noted that the pyramid-shaped horn 121 corresponds in shape with the pyramid-shaped cavity 43, and upon insertion of the former into the latter, proper alignment of the universal main frame 100 is attained with respect to the rear axle unit 22 of the tractor 20.

As can be best seen in FIGURE 5, the mounting bracket 123 is formed with a first journal box 124 and a first stop 125 located below the first journal box 124. The mounting bracket 123 is also provided with a second journal box 126 located forward and above said first journal box. A second stop 127 formed on the mounting bracket 123 is located below the second journal box 126. A pair of apertures 128 are formed along the lower edge of the mounting bracket. As can be best seen in FIGURE 2 the mounting bracket 123 is secured to the longitudinally extending beams 101 by nuts and bolts that extend through the apertures 128. It should be noted that the position of the mounting bracket with respect to the longitudinally extending beams 101 can be adjusted by aligning the pair of apertures 128 with any pair of a plurality of apertures 105 formed in the longitudinally extending beams 101. In FIGURE 2, three pairs of apertures 105 have been provided in beams 101, however, it is obvious that any number of pairs of apertures could be provided. As best seen in FIGURE 2, a lower slot 104 is formed in the longitudinally extending beam 101 above the plurality of apertures 105, and an upper slot 103 is formed in the longitudinally extending beam 101 above the lower slot 104. The lower slot 104 is aligned with the first journal box 124, and the upper slot 103 is aligned with the second journal box 126 when the mounting bracket 123 is secured in position on the longitudinally extending beams 101.

A pivot shaft 129 is adapted to be journaled in the first journal box 124. The pivot shaft 129 has end portions extending outwardly in both directions from the first journal box 124. On the inwardly extending end portion of the pivot shaft 129, there is a splined section 130. The inwardly extending end portion of the pivot shaft 129 also has an internally threaded bore 131. A pivot shaft arm 132 is rigidly secured to the outwardly extending end portion of the pivot shaft 129. A collar 133 having internal splines 134 that are adapted to match the splined section 130 of the pivot shaft is adapted to be positioned on said splined portion 130. The collar 133 has a radially extending lug 135 integral therewith. The lug 135 has an upper surface 136 and a lower surface 137. The lower surface 137 is arranged such that it will engage the first stop 125 formed on the mounting bracket 123 and thus prevent rotation of the collar 133 and the connected pivot shaft 129 beyond a given point. A lifting arm 138 having an internally splined end portion 139 is adapted to be slid on the pivot shaft adjacent the collar 133. The free end of the lifting arm 138 terminates in a bearing 140, and is adapted to receive a pin 145 that functions to connect the lifting arm 138 to the lifting link 143. The lifting link 143 has formed in its lower edge a groove 144 through which the pin 145 extends. The collar 133 and lifting arm 138 are held in position on the pivot shaft 129 by a washer 141 and a nut 142 that is screwed into the internal threads 131 of the pivot shaft 129. Because of the splined portion 130 of the pivot shaft 129 and the internal splines 134 of the collar 133 and the internal splines 139 of the lifting arm 138, the relative angles between the pivot shaft arm 132, the lug 135 and a lifting arm 138 can be readily adjusted. This adjustment is made by merely unscrewing the nut 142, removing the washer 141 which will then permit the lifting arm 138 and the collar 133 to be slid off the splined portion 130 of the pivot shaft 129. The collar 133 can then be rotated with respect to the pivot shaft 129 and slid back on into a new position. Likewise, the lifting arm 138 can be rotated and slid back on the pivot shaft in a new position. The washer 141 and nut 142 are then reapplied to secure the collar 133 and lifting arm 138 in the newly selected position. The purpose for providing adjustment between the pivot shaft arm 132, the lug 135 and the lifting arm 138 is to adapt the universal frame 100 for various tractors. The distance between the free end of the lifting arm 138 and the free end of the lever arms 127 of various tractors is rarely the same and then some means are required to compensate for the difference. Thus this difference can be accommodated for by merely changing the angular position of the lifting arm with respect to the pivot shaft 129. The amount of angular rotation of the pivot shaft 129, that is desired before the lower surface 137 of the lug 135 engages the first stop 125 is determined by numerous tractor dimensions such as its wheel base, its ground clearance, the distance from the rockshaft to the rear axle unit and the length of the rockshaft lever arms. Thus to properly adapt the universal main frame 100 for any of the many models and sizes of tractors it is desirable to be able to adjust the angle between the radially extending lug 135 and the lifting arm 138, and the splined connection between collar 133 and pivot shaft 129 accomplishes this. The upper end of the lifting links 143 are connected to the free ends of the lever arms 27 through the links 28.

A latch-bar 146 having a journal box 147 is adapted to be pivotally connected to the mounting bracket 123 by a stub-shaft 153 that extends through the latch-bars journal box 147 and the second journal box 126 of the mounting bracket 123. The latch-bar 146 has a radially extending lug 148 that has a side surface 149 and an end surface 150. The latch bar 146 also includes a hook 151 in a handle 152. A nest 154 is formed in the journal box 147 of the latch bar 146 and is adapted to receive a ball 157 formed on one end of a rod 156. The other end of the rod 156 is slidably received in an aperture formed in a bracket 155 (see FIGURE 2) which is mounted on the longitudinally extending beam 101 of the main frame. A spring 158 engaging the bracket 155 and a pin 159 extending through the rod 156 tends to bias the rod away from the bracket 155 and the ball 157 into the nest 154. By this means the latch bar 146 is biased in a counterclockwise direction as seen in FIGURE 2 causing the side surface 149 of lug 148 into engagement with the second stop 127 of the mounting bracket 123. When the latch bar 146 is so positioned, the end surface 150 of the radially extending lug 148 is located such that it will contact upper surface 136 of the lug 135 and thus prevent further rotation of collar 133 in the counterclockwise direction.

*Operation*

In preparing to mount the corn harvesting device the tractor is fitted with the front tractor mount 30, the rear tractor mounts 33 and the radiator air scoop 29. When needed the front tractor mount 30 is secured by bolts to the longitudinal chassis 21 as can be best seen in FIGURE 3. The rear tractor mounts 33 are provided in a variety of sizes to adapt the corn harvester to a large class of tractors. The rear tractor mounts shown in the illustration are designed to fit over the rear axle of a particular tractor and to position bar 45 relative to the ground and to the horizontal extending bar 32 of the front tractor mount 30.

The main frame 100 having a processing unit 300 mounted thereon is then coupled to the tractor. The tractor is backed over the main frame and positioned such that the V-shaped notches of the front guides 107 are substantially aligned with the plates 31 and horizontal bar 32 of the front tractor mount 30. The upper ends of the lifting links 143 are then pinned to the free ends of the lever arms 27 through the links 28. The center of gravity of the combined main frame 100 and processing unit 300 is behind the lifting links 143 and thus as the rockshaft 26 is actuated, the front portion of the main frame is elevated. As the front portion of the main frame is elevated, the front guides 107 including upwardly opening V-shaped notches are directed towards the horizontally extending bar 32 and are pivotally connected to the bar by the locks 108. After the front guides 107 have been pivotally secured to the bar 32, further rotation of rockshaft 26 causes the rear portion of the main frame to be elevated. This elevation continues until the pyramid-shaped horns 121 are seated in the pyramid-shaped cavities 43 of the rear tractor mounts 33. At this point latch bars 146 are manually actuated by the operator from his tractor seat to thus secure the main frame to the tractor. Since the main frame is no longer supported by the lifting links 143, the rockshaft 26 is now rotated clockwise to position the push rods 164 for mounting the picking unit 200.

The tractor having the main frame 100 and the processing unit 300 already mounted thereon is driven forwardly into the picking unit 200. Bars (not shown) carried by the downwardly extending post 230 of the picking unit 200 are seated in the picker mount 111 after being guided into place by the notches formed by the diverging edges 112. The operator then grasps handles 114 to rotate the cam plates 113 to thus properly seat and pivotally connect the rear portion of the picking unit 200 on the upright post 109 of the universal main frame 100. Rockshaft 26 is then rotated counterclockwise as seen in FIGURE 3 which causes the free ends of push rods 164 to engage sockets (not shown) in the forward portion of the picking unit 200. The desired position of the picking unit 200 is attained by manipulation of rockshaft 26.

A clockwise moment is exerted about bar 32 (as seen in FIGURE 2) by a force in the lift links 143. This lift link force is caused by that portion of the picking unit's weight carried by the push rods 164 and transferred through the lifting system to the lift links. The magnitude of this clockwise moment is a function of the weight of the snapping unit and its angle to the horizon. It is also influenced by the ratio of bellcrank arms 162 to 163 and the ratio of the pivot shaft arm 132 to the lifting arm 138. This clockwise moment tends to pivot the rear portion of main frame 100 upwardly about bar 32. There is also a counterclockwise moment about bar 32 tending to pivot the rear portion of the main frame 100 downwardly about bar 32. This counterclockwise moment is caused by the weight of the main frame 100, the processing unit and the vertical component of force exerted by the picking unit 200 on the push rods 164. It is essential to the proper operation of this harvester that the clockwise moment be larger than the counterclockwise.

As a result of this relationship, when the corn harvester is mounted on the tractor, there is no tension in the latch bar 146 and thus it may be moved to the unlatched position without affecting the relative position of the main frame 100 with the tractor. Releasing the latch bars 146 and positioning them such that the side surface 149 of the radially extending lug 148 is in engagement with the second stop 127, aligns the end surface 150 of the radially extending lug 148 such that it is in position to engage the upper surface 136 of the lug 135.

If it is desired to change processing units 300 with the picking unit 200 mounted, for example, to remove a husking unit and couple to a shelling unit, the latch bar 137 is pivoted to the unlatched position and the rockshaft 26 is then rotated clockwise, as seen in FIGURE 3, permitting the front of the picking unit 200 to be lowered causing lug 135 to raise until upper surface 136 engages end surface 150 of the radially extending lug 148. The position at which these two surfaces engage is preset and is adjusted to a point that will permit further clockwise rotation of rockshaft 26. Presetting of this position can be effected by sliding off collar 133, rotating it to the selected position and then reinserting it onto the splined portion 130 of pivot shaft 129. After surfaces 136 and 150 have engaged, further clockwise rotation of rockshaft 26 results in a clockwise rotation of the main frame 100 about bar 32. The processing unit 300 is pivotally connected to the main frame 100 about the support shafts 119 extending outwardly from the plates 118 as can be best seen in FIGURE 2. After the main frame 100 has been pivoted sufficiently such that the connection has been released the tractor can then be driven forward leaving the processing unit 300 standing on the ground. The tractor can then be backed into another processing unit and the above procedure reversed to couple this unit.

Obviously, many modifications and variations of the present invention are possible in the light of the above teachings. It is therefore to be understood that within the scope of the appended claims, the invention may be practiced otherwise than is specifically described.

What is claimed is:

1. A tractor mounted corn picker unit comprising; a tractor of the type having a longitudinally extending chassis, a rear axle unit, a dirigible front wheel, a hitch rockshaft having a lever arm secured thereto, a front tractor mount carried by said chassis between the rear axle unit and the front wheel, and a rear tractor mount carried by the rear axle unit; a longitudinally extending main frame having front and rear portions, front guides mounted on the top of said front portion adapted to engage the front support when the front portion of said main frame is elevated, a lifting link secured at one end to the rear portion of said main frame and adapted to be connected at the other end to the lever arm of said hitch rockshaft; said rear tractor mount including a main section having a bottom surface, an upwardly converging cavity formed in said main section with its base opening in the bottom surface, a bar extending generally horizontally from said main section; an upwardly tapering horn corresponding in shape to said upwardly converging cavity carried by the rear portion of said main frame such that upon elevating the rear portion of said main frame said upwardly tapering horn will be inserted into said upwardly converging cavity to properly align said main frame with respect to said rear tractor mounts; a latch bar including a hook pivotally supported on the rear portion of said main frame and adapted when pivoted to grasp the bar of said rear tractor mount to hold said main frame in the elevated position.

2. The invention as set forth in claim 1 wherein said rear tractor mount is releasably secured to said rear axle unit.

3. The invention as set forth in claim 1 wherein means are provided on the front portion of said main frame for raising and lowering the front end of a picking unit, a pivot shaft journaled on the rear portion of said main frame, a lifting arm secured to one end of said pivot shaft, said lifting link connected to the free end of said lifting arm, a pivot shaft arm secured to the other end of said pivot shaft and means connecting the free end of said pivot shaft arm to the mechanism for raising and lowering the front end of the picking unit.

4. The invention as set forth in claim 3, wherein said lifting arm has an internally splined aperture and said pivot shaft has mating external splines over a portion of its length permitting connection of the lifting arm to the pivot shaft at any selected angle.

5. The invention as set forth in claim 4, wherein a collar is provided having an internally splined aperture mating the external splines of said pivot shaft and adapted to be connected thereto by said splines in any selected position, a lug extending radially from said collar and having a lower surface, a first stop on said main frame adapted to be engaged by the lower surface of said lug to prevent further rotation of said pivot shaft in one direction.

6. The invention as set forth in claim 5, wherein the lug extending from said collar has an upper surface, and said latch bar has an integral lug extending radially from its pivot axis, said integral lug having an end surface and a side surface, a second stop on said main frame positioned to be engaged by the side surface of said integral lug to prevent further rotation of said latch bar in one direction, the end surface of said integral lug being positioned for engagement with the upper surface of said collar lug when the side surface of said integral lug is in engagement with said second stop.

7. A tractor mounted corn picking unit comprising; a tractor of the type having a longitudinally extending chassis, a rear axle unit, a dirigible front wheel, a hitch rockshaft having a lever arm secured thereto, a front tractor mount carried by said chassis between the rear axle unit and the front wheel, and a rear tractor mount carried by said rear axle unit; a longitudinally extending main frame having front and rear portions, front guides mounted on said front portion adapted to engage the front support when the front portion of said main frame is elevated, a mounting bracket adapted to be secured to the rear portion of said main frame, means on the rear portion of said main frame for securing said mounting bracket in a plurality of selected positions spaced longitudinally along said main frame, said mounting bracket having a first journal box and an adjacent first stop, and a second journal box and an adjacent second stop, a pivot shaft journaled in said first journal box, said pivot shaft having outwardly extending end portions, one of said end portions being splined, a pivot shaft arm rigidly secured to the other of said end portions, a collar having an internally splined bore adapted to be positioned in a selected position on the splined end portion of said pivot shaft, a lug having upper and lower surfaces extending radially from said collar, said lower surface being adapted to engage said first stop to prevent rotation of said pivot shaft beyond a selected position, a lifting arm having an internally splined bore dimensioned to receive the splined portion of said pivot shaft to permit relative adjustment of the lifting arm relative to the pivot shaft, means for retaining said lifting arm and collar against axial movement, a latch bar pivotally mounted in said second journal box, said latch bar including a hook portion and a radially extending lug having a side and an end surface, said side surface adapted to engage said second stop to prevent further rotation of said latch bar, and said end surface adapted when said side surface is in engagement with said second stop to engage the upper surface of said collar lug.

8. The invention as set forth in claim 7 wherein said rear tractor mount includes a main section having a bottom surface, an upwardly converging cavity formed in said main section with its base opening in the bottom surface, a bar extending generally horizontally from said main section and adapted to be grasped by the hook portion of said latch bar when the latch bar is rotated out of engagement with said second stop, an upwardly tapering horn corresponding in shape to said upwardly converging cavity carried by said rear portion of said main frame such that upon elevating the rear portion of said main frame said upwardly tapering horn will be inserted into said upwardly converging cavity to properly align said main frame with respect to said rear tractor mount.

9. The invention as set forth in claim 8, wherein a lifting link is connected at one end to the free end of said lifting arm and at its other end to the lever arm of said hitch rockshaft.

References Cited

UNITED STATES PATENTS

| | | | |
|---|---|---|---|
| 2,190,359 | 2/1940 | Hipple | 56—2 X |
| 2,831,307 | 4/1958 | Korsmo et al. | 56—2 |
| 3,035,384 | 5/1962 | Mitchell | 56—15 |
| 3,043,376 | 7/1962 | Green et al. | 172—274 |
| 3,159,956 | 12/1964 | Green et al. | 56—15 |
| 3,320,730 | 5/1967 | Barkstrom et al. | 56—15 |

ROBERT E. BAGWILL, *Primary Examiner.*